United States Patent

Matyscak

[11] Patent Number: 5,346,365
[45] Date of Patent: Sep. 13, 1994

[54] GAS TURBINE WITH EXHAUST GAS CASING AND EXHAUST GAS DUCT

[75] Inventor: Kamil Matyscak, Uehlingen-Brenden, Fed. Rep. of Germany

[73] Assignee: Asea Brown Boveri Ltd., Baden, Switzerland

[21] Appl. No.: 114,181

[22] Filed: Sep. 1, 1993

[30] Foreign Application Priority Data

Sep. 25, 1992 [DE] Fed. Rep. of Germany ....... 4232088

[51] Int. Cl.⁵ .............................................. F01D 25/28
[52] U.S. Cl. .................................. 415/213.1; 415/109; 415/209.3; 415/209.4; 415/211.2; 415/214.1; 415/220; 403/336; 403/337
[58] Field of Search ...................... 415/189, 190, 208.2, 415/209.2, 209.3, 209.4, 211.2, 213.1, 214.1, 220, 118, 201; 403/335, 336, 337, 338

[56] References Cited

U.S. PATENT DOCUMENTS

| | | | |
|---|---|---|---|
| 869,106 | 10/1907 | Schmidt | 403/337 |
| 2,803,429 | 8/1957 | Whitehead | 415/214.1 |
| 4,076,452 | 2/1978 | Hartmann | 415/213.1 |
| 5,102,298 | 4/1992 | Kreitmeier | 415/211.2 |

FOREIGN PATENT DOCUMENTS

| | | |
|---|---|---|
| 0417433A1 | 3/1991 | European Pat. Off. . |
| 0491966A1 | 7/1992 | European Pat. Off. . |
| 2619929 | 11/1976 | Fed. Rep. of Germany . |

*Primary Examiner*—Edward K. Look
*Assistant Examiner*—Christopher Verdier
*Attorney, Agent, or Firm*—Burns, Doane, Swecker & Mathis

[57] ABSTRACT

In a gas turbine, the exhaust gas casing (5) consists of a ring-shaped hub-end inner part (6) and a ring-shaped outer part (7), which parts bound a diffuser (9) and are provided with a horizontal split plane. The exhaust gas casing merges into an exhaust gas duct, whose boundary walls likewise consist of a ring-shaped hub-end inner part (16) and a ring-shaped outer part (17). The split locations between the exhaust gas casing and the exhaust gas duct are configured as flange connections (7A, 17A and 6A, 16A respectively). The flanges (7A, 17A and 6A and 16A respectively) at the split locations have a conically extending contact surface.

1 Claim, 1 Drawing Sheet

GAS TURBINE WITH EXHAUST GAS CASING AND EXHAUST GAS DUCT

BACKGROUND OF THE INVENTION

Field of the Invention

The invention relates to an axial flow turbomachine, in particular a gas turbine, in which the outlet rotor blades are followed downstream by an exhaust gas casing, whose boundary walls consist essentially of a ring-shaped hub-end inner part and a ring-shaped outer part which bound a diffuser and are provided with a horizontal split plane, and in which the exhaust gas casing merges into an exhaust gas duct, whose boundary walls likewise consist essentially of a ring-shaped hub-end inner part and a ring-shaped outer part, and in which the split locations between the exhaust gas casing and the exhaust gas duct are configured as a flange connection.

Discussion of Background

In stationary gas turbine installations, relatively long outlet diffusers, preferably extending in the axial direction, are provided for aerodynamic reasons and for improved influence on the efficiency. For this purpose, it is necessary to arrange the exhaust gas end bearing of the turbine rotor in the diffuser construction itself.

During transient operation, as occurs frequently in power station gas turbines used for peak load cover, for example, thermal stresses and differential expansions occur on the casings. These lead to changes in the clearance between the casing and the rotor and can also affect the shaft bearing arrangement. Blade damage and damage to the bearings and stuffing boxes can then occur. These disadvantages become particularly effective to an increased extent in the case of present-day modern machines with large dimensions and high temperatures.

In modern machines, the diffuser is no longer supported on the foundation itself but is integrated into the exhaust gas casing, which is in turn flanged onto the turbine casing of the turbomachine. The shaft bearing arrangement at the exhaust gas end is located within the diffuser inner ring in an environment which is extraordinarily hot during the operation of the machine. The bearing is located and the usually vertical load is accepted in the diffuser construction. Because of the low creep strength of the materials used, however, the whole of the supporting structure can deform in the course of time.

Simple access to the bearing part is, in consequence, of particular importance. Even if access is only needed to the bearing region in a machine of the type mentioned at the beginning, the complete exhaust gas part must, as a rule, be dismantled. This means that the bolted connections of the annular flange have first of all to be released over the complete periphery, that an element, for example the exhaust gas duct, must subsequently be displaced slightly axially in order not to damage the vertical flange surfaces during uncovering and recovering and that, finally, the bolted connections in the horizontal split plane are released, whereupon the upper halves of the casing can be lifted.

SUMMARY OF THE INVENTION

Accordingly, one object of this invention is to avoid this disadvantage and to create, in a machine of the type mentioned at the beginning, a measure by means of which the axial displacement of a machine part is avoided when the machine is being uncovered.

In accordance with the invention, this is achieved by the flanges at the split locations between the exhaust gas casing and the exhaust gas duct having a conically extending contact surface.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein an embodiment example of the invention is represented by means of a single-shaft axial flow gas turbine and wherein.

DESCRIPTION OF THE PREFERRED EMBODIMENTS

Figure 1:
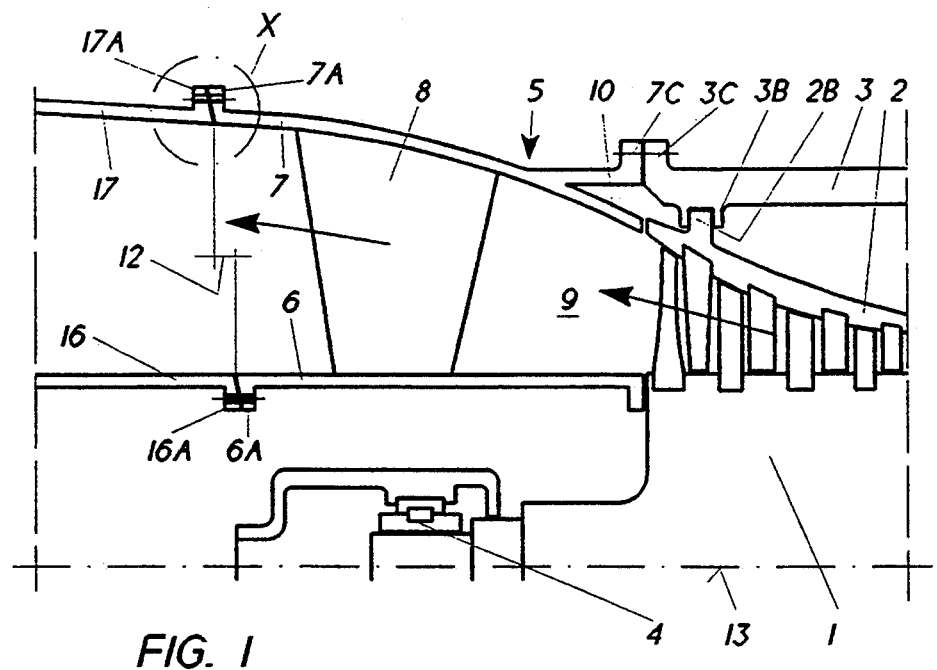
FIG. 1 shows a partial longitudinal section of the gas turbine.

Referring now to the drawings, wherein like reference numerals designate identical or corresponding parts throughout the several views, where only the elements essential for understanding the invention are shown (parts of the installation not shown are, for example, the compressor part, the combustion chamber and the complete exhaust pipe and the chimney), wherein the flow direction of the working medium is indicated by arrows and wherein like reference numerals designate identical or corresponding parts throughout the several views, the gas turbine, of which only the exhaust gas end and the four last, axial flow stages above the machine center line 13 are represented in FIG. 1, consists essentially of the rotor 1, with rotor blading, and the vane carrier 2, equipped with guide vanes. The vane carrier 2 is suspended by means of protrusions 2B in corresponding acceptance features 3B in the turbine casing 3. The exhaust gas casing 5 is flanged onto the turbine casing 3 and consists essentially of a ring-shaped hub-end inner part 6 and an ring-shaped outer part 7, which parts bound the diffuser 9. The two elements 6 and 7 are, as a rule, each comprised of two half-shells that are separable on a horizontal split plane 13. The two elements 6, 7 are connected to one another by a plurality of welded, radial streamlined struts 8, which are arranged evenly distributed around the periphery. The ring-shaped outer part 7 is provided, at the turbine end, with a ring-shaped sealing strip 10 which is flush with the cylinder-end contour of the turbine flow duct. The outlet-end bearing arrangement of the turbomachine is arranged in the hollow space in the inner part 6, the rotor 1 being located in a journal bearing 4.

The turbine casing 3 and the vane carrier 2 are provided with a horizontal split plane (not represented) located at the machine center line 13. The upper and lower halves of the turbine casing and the vane carrier, provided as a rule with flanges, are bolted together at this split plane.

The outer part 7 of the exhaust gas casing is provided with an annular flange 7C at the turbine end. This flange is bolted in a gas-tight manner to an annular flange 3C of the turbine casing 3.

An exhaust gas duct follows on from the exhaust gas casing 5 downstream of the streamlined struts 8. Its boundary walls consist of a ring-shaped hub-end inner part 16 and a ring-shaped outer part 17. This exhaust gas duct is, as a rule, a single-part welded construction without a horizontal split. The split locations between the exhaust gas casing and the exhaust gas duct are respectively configured as flange connections 7A, 17A and 6A, 16A.

Figure 2:
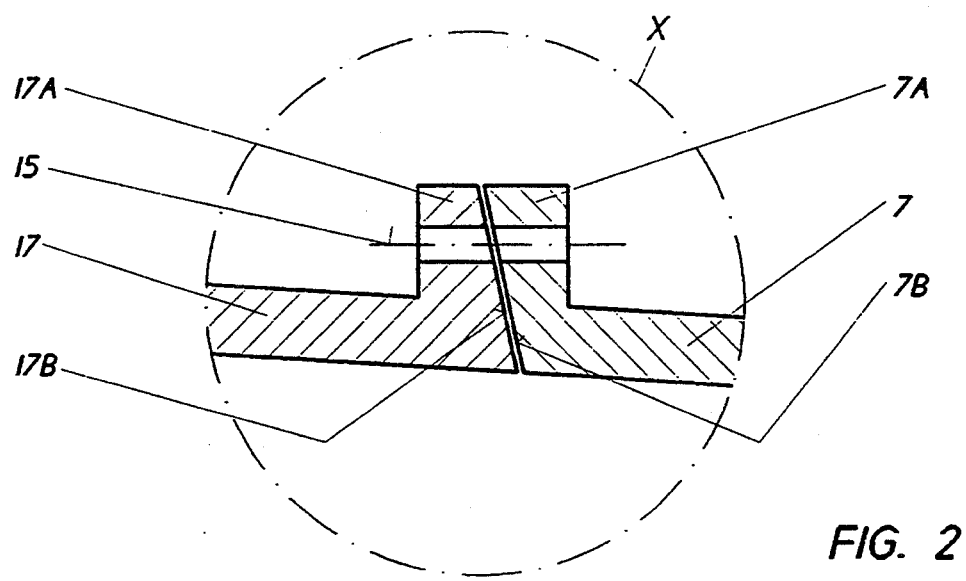
FIG. 2 shows an enlarged view of the detail X in FIG. 1.

In accordance with the invention, the respective flanges 7A, 17A and 6A, 16A are provided with conically extending contact surfaces 7B, 17B and 6B, 16B respectively at the split locations. The conicity extends in such a direction that after the release of the flange bolted connections, which are only indicated by their center lines 15 in FIG. 2, the upper half of the exhaust gas casing 5 can be lifted without the exhaust gas duct 16, 17 having to be moved. For this purpose, only the flange bolts 7A, 7C and 6A, respectively, at each end of the upper half of the exhaust gas casing 5 have to be removed. It is also only necessary to release the bolted connections in the horizontal split plane of the exhaust gas casing alone. Even when this upper part, which here consists of the parts 7, 6 and 8, is raised by the smallest amount, there is a gap between the conical contact surfaces in the flange region and this permits damage-free handling.

In order to ensure the raising of the exhaust gas casing without difficulty, the annular flanges 7A, 17A and 6A, 16A respectively are not located in the same vertical plane. The flanges 7A, 17A of the outer parts 7 and 17 are displaced axially downstream by the dimension 12 relative to the annular flanges 6A, 16A.

Obviously, numerous modifications and variations of the present invention are possible in light of the above teachings. In the case, which is not shown, where, for example, the diffuser has its own casing which is guided in the exhaust gas casing, its split flanges bounded at the exhaust gas duct are also advantageously equipped with the new measure. It is therefore to be understood that within the scope of the appended claims, the invention may be practiced otherwise than as specifically described herein.

| List of Designations | |
|---|---|
| 1 | Rotor |
| 2 | Vane carrier |
| 2B | Protrusion |
| 3 | Turbine casing |
| 3B | Acceptance feature |
| 3C | Annular flange |
| 4 | Journal bearing |
| 5 | Exhaust gas casing |
| 6 | Inner part of the exhaust gas casing |
| 6A | Annular flange |
| 7 | Outer part of the exhaust gas casing |
| 7A | Annular flange |
| 7C | Annular flange |
| 7B | Contact surface |
| 8 | Streamlined struts |
| 9 | Diffuser |
| 10 | Sealing strip |
| 12 | Axial distance apart |
| 13 | Machine center line |
| 15 | Center line of the flange bolted connection |
| 16 | Inner part of the exhaust gas duct |
| 16A | Annular flange |
| 17 | Outer part of the exhaust gas duct |
| 17A | Annular flange |
| 17B | Contact surface |

What is claimed as new and desired to be secured by letters patent of the United States is:

1. An axial flow turbomachine in which outlet rotor blades are followed downstream by at least an exhaust gas casing, comprising:

the exhaust gas casing having boundary walls that consist of a ring-shaped hub-end inner part and a ring-shaped outer part which bound a diffuser, the inner part and the outer part each comprising two half shells separable at a horizontal split plane;

the exhaust gas casing emerging into an exhaust gas duct, the exhaust gas duct having boundary walls that consist of a ring-shaped hub-end inner part and a ring-shaped outer part; and, flanges on the exhaust gas casing and the exhaust gas duct Connecting the respective inner parts and outer pans, wherein the flanges connecting the inner parts and the flanges connecting the outer parts located in different vertical planes, and wherein the flanges have conically extending contact surfaces,

* * * * *